(12) United States Patent
Stigwall et al.

(10) Patent No.: US 10,323,927 B2
(45) Date of Patent: Jun. 18, 2019

(54) CALIBRATION OF A TRIANGULATION SENSOR

(71) Applicant: HEXAGON TECHNOLOGY CENTER GMBH, Heerbrugg (CH)

(72) Inventors: Johan Stigwall, St. Gallen (CH); Beat Aebischer, Heerbrugg (CH); Peter Champ, Chorleywood (GB)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 16/015,792

(22) Filed: Jun. 22, 2018

(65) Prior Publication Data
US 2018/0372481 A1 Dec. 27, 2018

(30) Foreign Application Priority Data
Jun. 22, 2017 (EP) .................................... 17177439

(51) Int. Cl.
*G01B 11/25* (2006.01)
*G01B 11/00* (2006.01)
*G01B 21/04* (2006.01)

(52) U.S. Cl.
CPC ........ *G01B 11/005* (2013.01); *G01B 11/2504* (2013.01); *G01B 21/042* (2013.01)

(58) Field of Classification Search
CPC ... G01B 11/005; G01B 11/2504; G01B 11/25; G01B 21/042; G01B 21/04
See application file for complete search history.

(56) References Cited

U.S. PATENT DOCUMENTS

| 7,564,571 B2* | 7/2009 | Karabassi .......... G01B 11/2504 345/427 |
| 9,506,749 B2* | 11/2016 | Bellis ................. G01B 11/2545 |
| 2006/0268285 A1* | 11/2006 | Karabassi .......... G01B 11/2504 356/601 |

FOREIGN PATENT DOCUMENTS

| DE | 690 03 090 T2 | 2/1994 |
| DE | 10 2004 026 090 A1 | 12/2005 |
| EP | 1 524 494 A1 | 4/2005 |

(Continued)

OTHER PUBLICATIONS

European Search Report dated Jun. 22, 2018 as received in Application No. 17177439.

(Continued)

*Primary Examiner* — Roy M Punnoose
(74) *Attorney, Agent, or Firm* — Maschoff Brennan

(57) ABSTRACT

A method for calibrating a triangulation sensor including a light emitting unit for emitting measuring light and a light receiving unit. The light emitting unit is arranged with known position and orientation relative to the light receiving unit and the triangulation sensor which is adapted to provide triangulation-based position measurements. A calibration setup which comprises the triangulation sensor and a calibration target providing a defined calibration pattern, and a calibration measurement is performed with reference to the calibration target by means of the triangulation sensor. An image of the calibration target is captured by means of the light receiving unit, and the captured image is processed with deriving a pattern image position with reference to the inner sensor image coordinate system and deriving a light image position with reference to the inner sensor image coordinate system.

12 Claims, 5 Drawing Sheets

(56) References Cited

FOREIGN PATENT DOCUMENTS

| EP | 2 813 810 A1 | 12/2014 |
| WO | 2007/125081 A1 | 11/2007 |
| WO | 2011/000435 A1 | 1/2011 |

OTHER PUBLICATIONS

Santolaria, J., et al., "A one-step intrinsic and extrinsic calibration method for laser line scanner operation in coordinate measuring machines," Measurement Science and Technology, vol. 20, No. 4, p. 45107 (Mar. 10, 2009).

Xie, Z., et al., "Simultaneous calibration of the intrinsic and extrinsic parameters of structured-light sensors," Optics and Lasers in Engineering, vol. 58, pp. 9-18 (Feb. 7, 2014).

\* cited by examiner

CALIBRATION OF A TRIANGULATION SENSOR

CROSS-REFERENCE TO RELATED APPLICATIONS

This application claims priority to European Patent Application No. 17177439.1 filed on Jun. 22, 2017. The foregoing patent application are incorporated herein by reference.

FIELD OF INVENTION

The present invention generally pertains to respective methods for calibration of a triangulation sensor and for compensation of measurements based on the calibration.

BACKGROUND

It is common practice to inspect work pieces subsequent to production e.g. on a coordinate positioning apparatus, such as a coordinate measuring machine (CMM), in order to check for correctness of predefined object parameters, like dimensions and shape of the object. Moreover, a detection of a surface of an unknown object is of interest in many industrial applications. Such measurement typically also may be provided using a coordinate measuring machine or any other suitable type of scanning device.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probing unit) carried by the probe head. Such probing unit can be designed as a tactile probe or an optical sensor providing measurements of surfaces e.g. based on the principle of triangulation.

In a simple form of the machine a suitable transducer mounted parallel to each axis is able to determine the position of the probe head relative to a base of the machine and, therefore, to determine the coordinates of measurement points on the object being illuminated by the sensor. For providing movability of the probe head a typical coordinate measuring machine may comprise a frame structure on which the probe head is arranged and driving means for moving frame components of the frame structure relative to each other.

An advantage of using an optical sensor is that it is not in contact with the part and therefore does not deform it during the measurement or damage it, as may be the case with a tactile probe.

A further advantage of using a (line) triangulation device in combination with a CMM for measuring a surface is the amount of distance information being received by one time step, i.e. distance values along the entire projected triangulation line can be determined and respective coordinates can be derived. Thus, by moving the sensor along a desired measuring path an object to be measured can entirely be scanned significantly faster.

Over the past 20 years, manually operated portable CMM systems (e.g. articulated arm CMMs), comprising typically four segments linked together with one or two rotation axes per linkage and a total of six or seven axes, have become popular for non repetitive measurement tasks on the shop floor. Line triangulation devices are also used on such portable CMMs to greatly increase data capture speed.

Other portable measurement devices where triangulation units are used include optically tracked systems, either using multiple cameras to track the probe location and orientation or interferometric distance tracking devices, where the rotational axes of the probe are tracked using an additional camera.

Other applications for line triangulation sensors include fixed installations where an object is placed in front of the sensor or sensors and single line measurement(s) of the static object are made such that key features of the part can be captured in a single step without the need for expensive positioning systems.

Furthermore, a device for providing a topographic measurement of a surface can be embodied as a (hand-held) device comprising a triangulation sensor, wherein the device is guided along the surface to be measured—either manually or by a robot—and distance data is acquired by the sensor while moving the device. Additionally, the position and/or orientation of such device may continuously be determined (e.g. tracked) in a global coordinate system thus enabling a determination of absolute coordinates corresponding to the object's surface.

In general, triangulation provides a method for scanning a surface in fast and precise manner. Measuring devices working on that principle are for instance known from DE 10 2004 026 090 A1 or WO 2011/000435 A1.

In particular, a line generated by a laser unit, e.g. by moving a laser point along such line or by providing a laser fan, is generated on an object to be measured and the light reflected from the surface is detected by a camera consisting of a light sensitive image sensor (light detector) and electronics to control the image sensor and read out the image. An image of the reflected light is captured and distance information according to the contour of the detected line is derived. Based thereon, topography of the object's surface can be determined.

For triangulation measurements with high precision, an illumination and detection of respectively reflected light has to be provided which comprises a required level of illumination and an adequate detection of the light information. For adjusting illumination so that the reflected light reaches the detector meeting its respective detection properties (e.g. signal-to-noise level and saturation limit) WO 2011/000435 A1 discloses an approach of an in-advanced illumination in order to determine a suitable illumination level for the measuring light. WO 2007/125081 A1 discloses a further approach for actively controlling the power of illuminating light in dependency upon an intensity detected by a camera.

However, in case of regions to be illuminated which significantly differ regarding their reflecting properties there still remains the problem of providing a usable signal over the whole width of a projected laser line. Particularly, surfaces with low roughness, i.e. mirror-like surfaces such as chrome, are difficult to measure due to strong inhomogeneity of the reflected light towards the image sensor.

Another problem with respect to precision of measurements is the possible occurrence of long-term drifts of particular sensor components, e.g. of electronics or optical arrangements, or a drift concerning a relative arrangement of such components. Such drifts may be induced by thermal effects like heating up of a light source or by changing of ambient conditions. As one result of such effect position values which are measured with the system may be acquired with particular errors which finally result in erroneous position measurements.

Possible effects due to thermal changes are unknown tilting or offset of a laser plane which is generated by a laser source on side of a measuring light source. Such tilting or offset can cause significant erroneous measurements for instance regarding calculated distances. Furthermore, a deviation in position and/or orientation may also occur for the light receiving part of the sensor.

Therefore, there remains a problem of providing reliable measuring values in light of above mentioned long term drifts.

Above described problems relate to external influences on the measuring system which result in possible measurement errors. In advance of considering environmental influences there typically has to be provided a further (geometrical) calibration of the triangulation sensor which can guarantee for correct and accurate determination of measuring values. In particular, reference coordinates at an object can be measured with the triangulation sensor and verified or corrected by use of an additional measuring system.

Such basic calibration typically is comparatively time consuming with respect to setting up a calibration arrangement and quite complex as there has to be provided exact reference coordinate information.

BRIEF DESCRIPTION

It is therefore an object of some embodiments of the present invention to provide an improved triangulation sensor which is provided for consideration of above problems and to provide a respectively improved method of calibration.

Another object of some embodiments of the present invention is to provide an improved calibration method which allows for compensation of long term drifts and/or geometric deviations of a triangulation sensor arrangement.

Another object of some embodiments of the present invention is to provide an improved triangulation sensor which enables to apply respective compensation on conducted measurements.

Above objects are achieved by realising the features of the independent claims. Features which further develop the invention in an alternative or advantageous manner are described in the dependent patent claims.

Some embodiments of the invention relate to a method of calibrating a triangulation sensor (herein also called "scanner"). The triangulation sensor comprises a light emitting unit, in particular a laser diode, a light emitting diode (LED) or a superluminescent LED (SLED), for emitting measuring light of defined chromatic measuring properties with a defined light pattern and a light receiving unit, in particular a camera, for reception of light according to defined chromatic reception properties, wherein the chromatic reception properties are adjusted to the chromatic measuring properties.

The light emitting unit is arranged with known position and orientation relative to the light receiving unit and the triangulation sensor is adapted to provide triangulation-based position measurements, in particular with reference to an outer coordinate system by determining image positions of reflected measuring light in an inner sensor image coordinate system. The inner sensor image coordinate system is defined by the triangulation sensor, e.g. by an image sensor of the triangulation sensor.

For that, the measuring light can be emitted and directed to an object to be measured and at least a part of the measuring light which is reflected at the object (and back-scattered) can be detected on side of the light receiving unit. Based on the known design and arrangement of the sensor, distance data can thus be calculated by applying respective triangulation principles. The distance data may comprise a plurality of distance values with reference to an extension of the light pattern. An axial measuring Y-axis may be coaxial with or parallel to a central optical axis of the light emitting unit.

The method comprises providing a calibration setup with the triangulation sensor and a calibration target, the calibration target providing a defined calibration pattern. A calibration measurement is performed with reference to the calibration target by means of the triangulation sensor.

According to that first aspect of some embodiments of the invention the triangulation sensor and the calibration target are provided in defined relative position with reference to an outer (global, machine or real world) coordinate system. In particular, a relative distance and orientation is thereby known. The measuring light is directed towards the calibration target so that the measuring light impinges on the calibration target and a respective projection of the light pattern (e.g. a light line) is provided. An image of the calibration target is captured by means of the light receiving unit on side of the triangulation sensor.

In a next step, the captured image is processed. A pattern image position with reference to the inner sensor image coordinate system is derived, wherein the pattern image position provides information about a position of the calibration pattern in the captured image and a light image position with reference to the inner sensor image coordinate system is derived, the light image position provides information about a position of the measuring light impinging on the calibration target in the captured image (a position of the projection of the light pattern).

Calibration data is derived based on the relative position of the triangulation sensor and the calibration target, based on the pattern image position and based on the light image position.

This means the calibration data can be based on the knowledge of distance and direction between the sensor and the target with reference to the outer coordinate system, a position in the image which represents a position of the target or of its feature with reference to the inner coordinate system and a position of the light pattern also with reference to the inner coordinate system. Having positional information for the target or its patterns both with reference to the outer and with reference to the inner coordinate system enables to transform the inner coordinates of the light pattern to the outer coordinate system and thus to provide determination of the position of the projected measuring light with reference to the outer system. By that a position of the measuring light relative to the calibration pattern is given and can be used as calibration data.

An advantage of the present invention is given by the fact that the light receiving unit, e.g. a camera having a CCD or CMOS sensor and respective optical elements, is enabled to detect not only measuring light but also to detect (and identify) the calibration pattern which may either be illuminated by the measuring or additional light of adjusted wavelength or which may be actively illuminated, e.g. self-luminous, with respectively adjusted light. By that, performing the calibration becomes simpler and faster.

In the present application there is distinguished between an inner sensor image coordinate system (I, J) and an outer coordinate system (X, Y, Z). The outer coordinate system can refer to a measuring coordinate system of the triangulation sensor and/or to a further coordinate system to which the measuring coordinate system is referenced (by known transformation of coordinates), e.g. to a coordinate system defined by a CMM. As for the present invention known reference between those coordinate systems may be preferred, both those coordinate systems are referred to as the outer coordinate system (X, Y, Z). Of course, the axes of the triangulation sensor and the further coordinate system do not necessarily have to be parallel to each others.

The inner sensor image coordinate system relates to image pixels and their coordinates on an image sensor on side of the triangulation sensor (2D). A point in the outer coordinate system which can be seen by the image sensor can be expressed with inner and/or outer coordinates.

In one embodiment the calibration pattern defines a reference point at the calibration target and a reference point image position which represents the position of the reference point in the captures image is determined based on the processing of the captured image. For example, the pattern is embodied as a circle and the reference point is the centre point of the circle. By that, a position of the light pattern relative to the calibration pattern can be determined with high precision.

A distance and/or an orientation of the impinging measuring light relative to the reference point image position can be determined in the captured image by processing the captured image. By determining the orientation a possible tilt of a laser plane can be recorded. The distance may represent a respective offset.

An offset of a projection of the measuring light relative to the reference point can be derived and the calibration data can be processed based on the offset. A respective distance between the projection of the measuring light and the reference point can be determined in the image and transformed to real world coordinates which gives information about the offset with reference to a real scale. By that, respective calibration information is given which provides respective compensation of measured position data.

According to one embodiment a defined distance between the triangulation sensor and the reference point is provided with reference to the outer coordinate system and calibrating the triangulation sensor is performed based on respective distance data referring to the outer coordinate system, the reference point image position referring to the inner image coordinate system defined by the triangulation sensor and the light image position referring to the inner image coordinate system. A transformation of coordinate data is thus provided based on two sets of coordinate data for the reference point, wherein a first set refers to the outer coordinate system and a second set refers to the inner coordinate system.

A calibration of the light receiving unit can be based on the defined relative position of the triangulation sensor and the calibration target and the pattern image position.

A calibration of the light emitting unit can be based on the defined relative position of the triangulation sensor and the calibration target and the light image position.

According to an embodiment the calibration target is illuminated with light of defined chromatic illumination properties, wherein the chromatic illumination properties are adjusted to the chromatic reception properties so that measuring light and illumination light is detectable by the light receiving unit. Such additional illumination may provide improved recognition of the calibration pattern by means of the light receiving unit.

In particular, the illumination light can be emitted by an illumination unit different, in particular separated, from the light emitting unit. Alternatively, the light emitting unit of the sensor can comprise an additional light source for such illumination.

According to an embodiment of the invention the calibration setup comprises a positioning device which is arranged to provide defined and variable relative positioning of the calibration target and the triangulation sensor, in particular wherein a position of the calibration target and/or of the triangulation sensor is provided as coordinate data related to the outer coordinate system. For instance, the positioning device enables to move the calibration target or the triangulation sensor along a defined path while respective coordinates of the moved element are provided and can be processed for generation of the calibration data. The moved element can also be held at a defined position, e.g. for performing a calibration measurement in such alignment.

The calibration target can be designed so that it provides active illumination of the calibration feature/pattern. This provides detection of the calibration pattern also without additional external illumination. Such can be preferred in case the sensor is arranged at the positioning device to be moved.

In particular, the positioning device is controlled so that the relative position of the triangulation sensor and the calibration target is sequentially or continuously varied in defined manner and a set of different relative positions is defined, wherein the measuring light remains impinging on the calibration target, in particular wherein the position is varied in a direction basically orthogonal to an emission axis of the measuring light.

For example, the calibration target is moved in a direction so that the measuring light which may be provided as a laser line is scanned over the calibration target. In other words, a sweep of the measuring light over at least a part of the calibration target can be provided with the positioning device by providing relative movement between the calibration target and the triangulation sensor, in particular in a plane orthogonal to an emission axis of the measuring light.

In an embodiment of the invention a series of images of the calibration target is captured according to the set of different relative positions by means of the light receiving unit. The series of images is processed and by that a series of pattern image positions is derived which provides information about positions of the calibration pattern in the series of images, i.e. also information about a positional change of the target or the sensor. In particular, a series of light image positions is derived which provides information about positions of the measuring light impinging on the calibration target in the series of images. The calibration data is derived based on the set of different relative positions, the series of pattern image positions and in particular the series of light image positions.

For example, the calibration target may be moved such that the reference point of the calibration pattern lies on the projected laser plane. Such allows to determine a position of the laser plane with high precision.

As a further example, a centre point for each of at least two different distances between the sensor and the target can be derived in the machine coordinate system, wherein the centre point corresponds to an intersection of a light emission plane and a central vertical reference of the calibration pattern, e.g. a diameter of a ring pattern, A virtual plane can be fitted according to the determined centre points.

The positioning device can be embodied as a coordinate measuring machine (CMM), wherein the calibration target is arranged at the probe head for being varied in its position by means of the coordinate measuring machine, in particular for providing the set of different relative positions, or the triangulation sensor is arranged at the probe head for being varied in its position by means of the coordinate measuring machine, in particular for providing the set of different relative positions.

The CMM may be embodied as a portal CMM, a SCARA-type machine or as an articulated arm. It is to be understood that the CMM may alternatively be embodied according to any other type of CMM known from prior art. An advantage of using a CMM is that relative positions and changes thereof can be provided with high precision and in automated (controlled) manner.

The CMM can be controlled to move the target or the sensor along a defined path. The CMM may be moved by 1 to 200 mm/s, in particular by 5 or 10 mm/s.

Furthermore, a position of the fixed part (sensor or target) can also be determined by means of a measuring probe on side of the CMM. By that, not any further measuring device is needed to provide exact relative positions. In addition or alternatively, the relative orientation of the calibration parts can be determined that way and based thereon a relative movement or position for a calibration measurement can be defined.

In one embodiment the positioning device can be realised by a comparatively simple displacement unit, wherein a movement and position of the moved element can be tracked by a further measuring device like a laser tracker. Such system may be used e.g. if the whole calibration setup is arranged inside a climatic chamber to guarantee constant or well defined varied temperatures over calibration. A respective temperature can also be considered for deriving the calibration data.

According to one embodiment the sweep of the measuring light over at least a part of the calibration target can be provided with at least two different distances between the calibration target and the triangulation sensor and a centre point for each of the at least two different distances can be determined in the machine coordinate system, the centre point corresponds to an intersection of the light emission axis and the calibration pattern. A virtual (laser) plane can be fitted according to the determined centre points.

Some embodiments of the invention also relate to a controlling and processing unit for calibration of a triangulation sensor (scanner) by use of a calibration target which has a particular calibration pattern. The controlling and processing unit comprises calibration functionality by execution of which a generation of calibration data is provided by
  receiving positional information regarding a defined relative position of the triangulation sensor and the calibration target with reference to an outer coordinate system,
  receiving a pattern image position with reference to an inner sensor image coordinate system, the pattern image position provides information about a position of the calibration pattern in an image captured by a light receiving unit of the scanner,
  receiving a light image position with reference to the inner sensor image coordinate system, the light image position provides information about a position of measuring light impinging on the calibration target in the captured image, and
  deriving the calibration data based on the relative position of the triangulation sensor and the calibration target, the pattern image position and the light image position.

It is to be understood that the controlling and processing unit and its calibration functionality are adapted to derive calibration data based on a method of above. The controlling and processing unit can be adapted to control, initiate and/or respectively execute the steps of the method as described above. Alternatively or additionally, the controlling and processing unit can be provided by the triangulation sensor. The controlling and processing unit can be adapted to check if respective steps are complete, e.g. if the target and the sensor are positioned with respective relationship or if the measuring light is emitted. For that, the controlling and processing unit can be configured to wait for a respective input by which a respective method step is confirmed.

Moreover, some embodiments of the invention relate to a respective computer program product which has computer-executable instructions implemented for executing, checking and/or controlling at least the step of calibrating a triangulation sensor of
  directing the measuring light towards the calibration target so that the measuring light impinges on the calibration target,
  capturing an image of the calibration target by means of the light receiving unit,
  processing the captured image by deriving a pattern image position with reference to the inner sensor image coordinate system and deriving a light image position with reference to the inner sensor image coordinate system, and
  deriving the calibration data based on the relative position of the triangulation sensor and the calibration target, the pattern image position and the light image position,
of a method of above, in particular when run on the controlling and processing unit.

The computer program product may comprise a respective algorithm which allows to process received data or to actively execute a measurement by the triangulation sensor.

Moreover, the computer program product may also be configured and arranged (connected) to control a CMM in order to provide respective variation of a relative position between the sensor and the target.

A further aspect of some embodiments of the invention relates to the following method for calibrating a triangulation sensor. The triangulation sensor comprises a light emitting unit, in particular a laser diode, for emitting measuring light of defined chromatic measuring properties with a defined light pattern and a light receiving unit, in particular a camera, for reception of light according to defined chromatic reception properties, wherein the chromatic reception properties are adjusted to the chromatic measuring properties.

The light emitting unit is arranged with known position and orientation relative to the light receiving unit and the triangulation sensor is adapted to provide triangulation-based position measurements, in particular with reference to an outer coordinate system by determining image positions of reflected measuring light in an inner sensor image coordinate system.

The method comprises providing a calibration setup which comprises the triangulation sensor and a calibration target, the calibration target providing a defined calibration feature, and performing a calibration measurement with reference to the calibration target by means of the triangulation sensor.

The triangulation sensor and the calibration target are provided inside a climate volume in defined relative position with reference to an outer coordinate system. The climate volume can be a climatic chamber or similar. The properties of the enclosed volume, like temperature or humidity, can be set and varied in defined manner. In particular, the volume can be chosen to enclose a calibration setup which may comprise a CMM or the like.

The measuring light of the triangulation sensor is directed towards the calibration target so that it impinges on the calibration target. Furthermore, a defined variation of a temperature in the climate volume is applied and a set of calibration temperatures is defined thereby. By that a defined calibration of the triangulation sensor over temperature becomes possible.

A set of images of the calibration target is captured by means of the light receiving unit at least according to the set of calibration temperatures. For example, there are provided three well defined calibration temperatures and at each temperature a respective image is captured.

The set of captured images is processed by deriving a respective set of light pattern appearances with reference to the inner sensor image coordinate system, the light pattern appearances provide information about courses and/or positions of the light pattern projected onto the calibration target in the captured image.

Calibration data is derived based on the relative position of the triangulation sensor and the calibration target, the set of calibration temperatures and the set of light pattern appearances.

By having a respective series of recorded light pattern appearances, i.e. positions and/or orientations of the projected measuring light, a change in that appearance can be tracked and information regarding a drift of the emitted measuring light over temperature can be derived.

In particular, the measuring light is emitted so that a laser line is defined, wherein a reference orientation of the laser line can be adjusted to be parallel or perpendicular to a lateral measuring X-axis, in particular wherein the measuring light is designed as a laser line and a laser plane is defined by emitting of the measuring light.

An advantage of providing the measuring light in form of one or more lines, in particular of a laser line, is that a comparatively large amount of distance data can be generated by acquiring one image of the projected line and deriving or calculating respective distances along the captured line based on a position and/or orientation of the line as captured in the image. In case of a pattern with more than one line, the lines can preferably intersect or being oriented inclined relative to each other.

A triangulation sensor according to the invention can typically be equipped with a light source which generates a light line or more particularly with a laser source which is designed to provide a laser line. Position and/or distance measurements to measuring points at an object can be provided along the entire line (simultaneously) by capturing and processing an image of the projected line.

In one embodiment the calibration feature is embodied as a calibration pattern and the processing of the set of captured images comprises deriving a set of pattern image positions with reference to the inner sensor image coordinate system, the pattern image positions provide information about a position of the calibration pattern in the captured images. The calibration feature can be realised according to a pattern mentioned above or shown below. The calibration pattern can be printed onto the calibration target and be illuminated with an additional illumination light source.

Assuming that the relative arrangement of sensor and calibration target is constant (the calibration setup may be built with materials of low coefficient of thermal expansion CTE) a calibration of the light receiving unit over temperature becomes possible. In case the position of the calibration pattern in the image changes, a drift in image acquisition can be determined accordingly.

By that, an individual and independent calibration of camera and laser source of a triangulation sensor is provided.

An orientation and/or position of the projected light pattern can be determined, in particular a tilt relative to the calibration target, based on a light pattern appearance and a pattern image position. Such tilt can be considered by generating the calibration data.

According to a further embodiment of the invention, the calibration feature is provided by a structural design of the calibration target, wherein the calibration target defines at least one edge. The measuring light is directed towards the calibration target so that the light pattern covers the edge and deriving the set of light pattern appearances comprises determining the courses of the projected light patterns covering the edge. In other words, the calibration target is provided by a specifically designed artefact, which allows e.g. determination of a height of the projected measuring light (position in Z-direction) and a tilt of the projection by processing the shape of the projection on the target.

In particular, the calibration target is aligned and designed so that the calibration feature provides a planar surface facing the triangulation sensor, in particular wherein a normal on the planar surface is parallel to an optical axis of the light emitting unit, the planar surface provides a varying width in a first direction (X- or I-direction, wherein X refers to the outer and I refers to the inner coordinate system) with respect to a second direction (Z or J), in particular provides a triangular shape, and the determinations of the set of light pattern appearances comprise determining the extensions of the light pattern on the planar surface in the first direction (X) based on the known width of the surface and deriving a position of the light pattern in the second direction (Z) based on the determined width.

The calibration target may be aligned and designed so that the calibration feature provides at least one sloped surface relative to the triangulation sensor, i.e. the surface comprises a defined inclination relative to the sensor or relative to a plane which is perpendicular to the measuring axis. The determinations of the set of light pattern appearances comprise determining an orientation of the light patterns on the sloped surface and deriving tilt information for the measuring light based on at least the determined orientations of the light pattern.

According to some embodiments of the invention an orientation of the projected light pattern can be derived, in particular a tilt relative to the calibration target, based on an orientations of the light pattern and a determination of the calibration feature.

Moreover, an offset of the emitted measuring light relative to a (reference) emission axis can be determined based on one of the light pattern appearances.

In one embodiment of the invention a plurality of calibration targets is provided each of which having a calibration feature, wherein image data relating to the plurality of calibration targets is acquired and processed with respect to light pattern appearances and/or pattern image positions. The plurality of targets provides for calibration with both higher precision and more degrees of freedom.

As already mentioned now in other words, a set of camera calibration parameters can be determined by determining positions of a reference feature in the set of images, in particular according to the set of calibration temperatures, wherein the reference feature is provided with known shape and dimension in a defined position in the outer coordinate system. This allows for calibration of the light receiving system.

In particular a set of feature image positions can be derived based on the set of captured images by determining positions for the calibration feature in the set of images and the calibration data may be derived by interpolating the positions. This enables to provide respective calibrations over a defined temperature range.

According to some embodiments of the invention, a calibration function can be derived based on the calibration data, wherein the calibration function provides compensation data with respect to an orientation of the light emitting unit relative to the light receiving unit, and/or a distance and/or orientation between the triangulation sensor and the calibration target as a function of temperature. Such function may provide a continuous representation of a distance error in dependency of temperature data. It may be realized as a look-up table.

The thermal compensation, i.e. in particular the calibration function, can provide modelling any 6-DOF drift of the laser or the camera independently (i.e. in total 12 degrees of freedom).

A tilt angle at which the measuring light is emitted can be determined based on the calibration data; the tilt angle represents a rotation of a light emitting axis around an I-axis orthogonal to an emission axis and/or around a Y-axis parallel to the emission axis.

The calibration setup and/or the calibration target may be built of a (quasi) a-thermal material (e.g. Zerodur) of may be built from material the thermal expansion coefficient of which is well known so that a possible dimensional change of the artefact due to temperature variation can be considered with the calibration method.

The relative position and orientation of the target and the sensor preferably remain unchanged during a temperature calibration measurement. Knowledge about a reference distance between the triangulation sensor and the calibration artefact (e.g. the distance measured at normal measuring conditions to at least one particular point at the artefact) can be used for generation of the calibration data. Measured positions, in particular Y-coordinates of the positions, can be put in relation to the reference distance and particular deviations from the reference distance can be derived for the respective coordinates.

In one embodiment the measuring light is emitted so that a laser line is defined, wherein a reference orientation of the laser line is parallel to the lateral measuring X-axis (I-axis). The laser line may alternatively be provided by 1D-scanning of a spot-like laser beam in one direction.

Coordinate values with respect to the X-axis and the Y-axis can be determined by repeatedly measuring positions for the plurality of measuring points along the line. This means that for each position a coordinate relating to the X-axis and a coordinate relating to the Y-axis can be determined.

According to one embodiment of the invention the calibration data can comprise a look-up table or matrix which provides a set of compensation distance values, wherein a particular compensation distance value is identifiable based on a selection of a defined temperature and correspondingly assigned coordinates. In other words, by using temperature, image coordinate X-value and Y-value as input variables a related compensation value can be derived based on the information comprised in the look-up table or matrix. The look-up table may have finite grid spacing and values between the grid nodes are interpolated to provide a continuous compensation function.

The calibration data can be derived by interpolating the measured positions for the plurality of measuring points for at least one temperature, in particular for the varied temperatures over a time period. A respective interpolation allows to more precisely represent a course or the distance drift with reference to coordinate axes.

Some embodiments of the invention also relate to a controlling and processing unit for calibration of a triangulation sensor by use of a calibration target, wherein the controlling and processing unit comprises a calibration functionality by execution of which a generation of calibration data is provided by
receiving positional information regarding a defined relative position of the triangulation sensor and the calibration target with reference to an outer coordinate system,
receiving an information about a set of calibration temperatures of a climate volume within which the triangulation sensor and the calibration target are arranged,
receiving a set of light pattern appearances with reference to the inner sensor image coordinate system, the light pattern appearances provide information about courses and/or positions of a light pattern projected on the calibration target in a captured image, and
deriving the calibration data based on the relative position of the triangulation sensor and the calibration target, the set of calibration temperatures and the set of light pattern appearances.

The controlling and processing unit can be adapted to control, initiate and/or respectively execute the method steps of a method of above. Also, the controlling and processing unit can be provided by the triangulation sensor.

Some embodiments of the invention also relate to a computer program product having computer-executable instructions implemented for executing and respectively controlling at least the step of calibrating a triangulation sensor of
directing measuring light towards a calibration target so that the measuring light impinges on the calibration target,
applying a defined variation of a temperature in the climate volume and thereby defining a set of calibration temperatures,
capturing a set of images of the calibration target by means of the light receiving unit at least according to the set of calibration temperatures,
processing the set of captured images with deriving a respective set of light pattern appearances with reference to the inner sensor image coordinate system, the light pattern appearances provide information about courses and/or positions of the light pattern projected on the calibration target in the captured image, and
deriving calibration data based on the relative position of the triangulation sensor and the calibration target the set of calibration temperatures and the set of light pattern appearances,
of a method of above, in particular when run on a controlling and processing unit as mentioned before.

The computer program product may comprise a respective algorithm for controlling a process step or for checking if any of the steps is performed.

BRIEF SUMMARY OF THE DRAWINGS

The method according to the invention is described or explained in more detail below, purely by way of example, with reference to working examples shown schematically in the drawings. Specifically.

DETAILED DESCRIPTION

Figure 1:
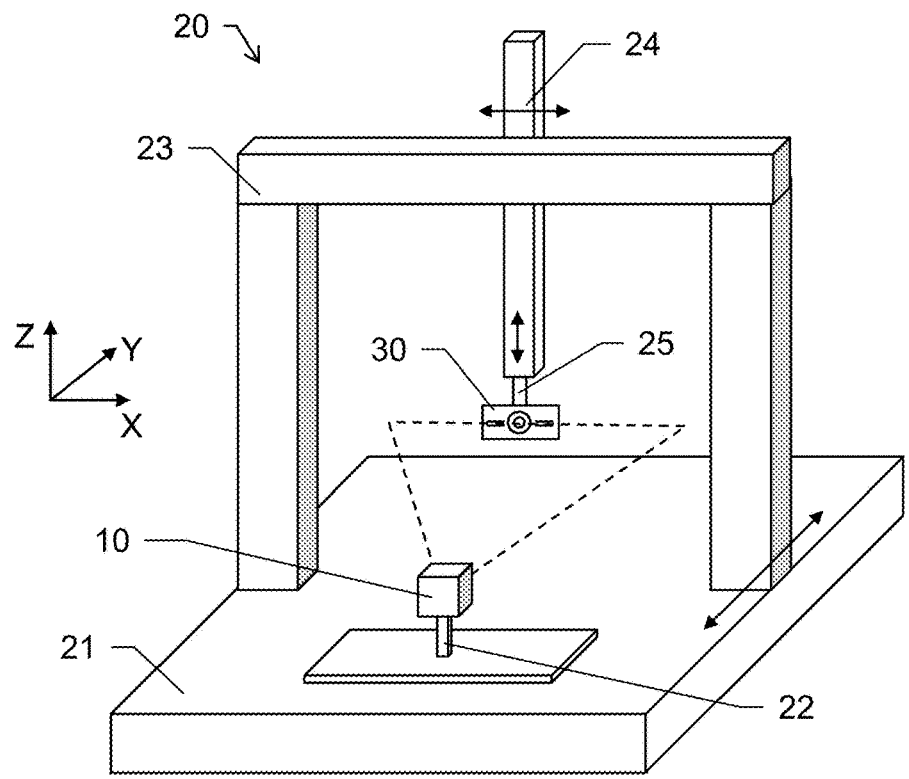
FIG. 1 shows an arrangement providing execution of a method according to the invention.

FIG. 1 shows a calibration embodiment according to the invention. A laser triangulation sensor 10 is arranged on the base 21 of a coordinate measuring machine 20 (CMM). A mounting unit 22 provides a reproducible mounting of such sensor 10 on the CMM 20.

The CMM 20 further comprises a frame structure having a portal 23 and a Z-ram 24 for providing movability of a probe or tool head 25 relative to the base 21. The head 25 can be moved at least in three axis X, Y, Z. The head and/or the CMM structure may further be designed so that a rotational movement of the head 25 is provided as well.

A calibration target 30 is arranged at the head 25 of the CMM 20. By that, a movement of the target 30 relative to the triangulation sensor 10 can be provided by controlling the CMM 20.

In general, the CMM 20 and the positioning of the triangulation sensor 10 at a known position on the base 21 provide a defined and known relative positioning of the two calibration elements (sensor 10 and target 30). The CMM 20 provides determination of coordinate data referring to an actual position of the target 30. Hence, a relative position, e.g. a distance and/or orientation, between the triangulation sensor 10 and the calibration target is provided respectively, e.g. also for varied positions of the target 30.

X, Y and Z define a coordinate system fixed to the CMM, wherein X, Y and Z are to be understood as also being fixed to the scanner 10 for calibration as the scanner is mounted onto the CMM. Scanner and CMM may be calibrated relative to each other respectively. In other words, the scanner itself may define a further (outer) measuring coordinate system, wherein coordinates are determined with respect to that further system by taking a measurement with the scanner. By knowing about a relative transformation of the systems, the outer scanner coordinates can be expressed in CMM coordinates as well. For simplification, such expression is applied in the present application.

Of course, at first the relation between the outer scanner coordinates and CMM coordinates is not exactly known. This is what a CMM-to-scanner alignment process figures out. Once there is established the respective transformation one can perform a calibration measurement according to the invention. In the end, the calibration provides a conversion from inner sensor image pixel 2D coordinates I, J to local outer 3D coordinates X, Y and Z.

The calibration target 30 can be designed for geometrical and/or temperature calibration. It allows a direct measurement of the correspondence between single 2D points in an image of the target and corresponding 3D real world coordinates. Since each point in such calibration then only relies on a small number of measurements around a local region of a point it is easy to obtain a high resolution calibration map which can take into account e.g. small-scale laser line non-straightness and lens distortions. This is done by utilizing a target with a photogrammetric feature allowing simultaneous measurement of a light pattern, e.g. a laser line, and the feature.

To map the calibration function from 2D pixel coordinate to 3D real world coordinate, the single calibration target 30 with such photogrammetrical point feature onto which the light pattern (laser line) is simultaneously projected can be translated by a motion system (e.g. as shown by a stationary coordinate measuring machine CMM) over an entire measuring plane with a fine measurement point spacing (e.g. 0.5-5 mm) or in continuous manner. Using the CMM 20 calibrated in a traceable manner for this motion, the absolute accuracy of the triangulation scanner 10 is also traceable and accurate. FIG. 1 shows an example where a sensor 10 is mounted to the table 21 of a CMM 20 and the calibration target 30 to the motion platform 25 (head).

The setup may also be reversed with the scanner 10 moveable and the calibration target 30 fixed to the table 21 of the CMM 20 (not shown).

According to an embodiment the target may further be illuminated by one or more illumination modules on the sides of the sensor 10 or structurally separated from the sensor.

In order to image a photogrammetrical target structure it can be advantageous to illuminate a wider portion of it than only a region which would be illuminated by the measuring light. Therefore, an external illumination may be provided.

The geometrical calibration can either be setup with the sensor 10 or the calibration target 30 on the motion platform of the CMM 20, and the other of the two mounted fixed e.g. to the CMM base 21. If the sensor 10 is already CMM compatible it can be beneficial to mount it to the CMM head 25 since the illumination then only needs to illuminate the small fixed target. When calibrating multiple sensors 10 in one batch they can then be automatically exchanged using a standard CMM tool changer.

If the triangulation sensor 10 is not CMM compatible it may be beneficial to mount it fixed to simplify cabling and allow multi-sensor batch calibration. In this case, more and wider angle illumination may be required to cover all possible locations of the target 30. A setup with one triangulation sensor 10 is shown in FIG. 1.

A setup with a series of sensors may be arranged so that the sensors are located next to each other. Thus, for each scanner, two neighbouring illumination modules may be triggered during scanning to obtain basically constant illumination intensity.

With the target 30 moveable, it can be beneficial if the illumination only lights up a comparatively narrow (5-10 mm) region e.g. centred around a projected laser plane of the measuring light of the sensor. By collimating the illuminating light vertically so that the width of the illuminated region is constant, the fall-off in intensity with distance can be adjusted to be linear (instead of quadratic for an omni-directional point source emitter) and thus matches the fall-off of the light line itself. Thus, the contrast between projected measuring light and further illumination remains constant. Also, the optical efficiency is higher than for an omni-directional light, which reduces heat generation in the illumination modules which could otherwise affect the accuracy of the sensor 10 by heating it or the CMM 20.

Figure 2A:
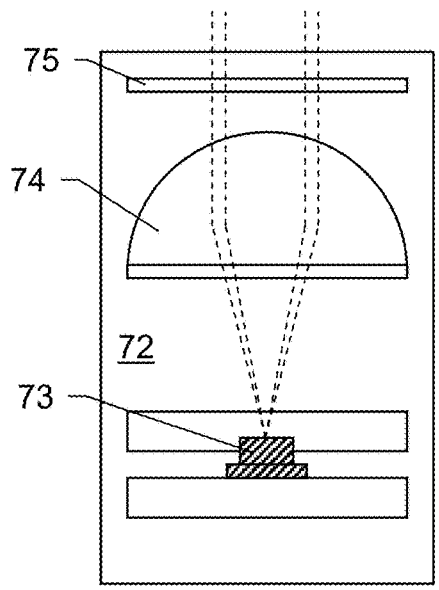
FIGS. 2a-b show an embodiment of a light emitting or illumination unit according to the invention.

Such a module 72 using laser diodes 73 for illumination is shown in FIGS. 2a (side view) and 2b (top view). It is to be understood that instead of laser diodes also LEDs or similar light sources can be provided. The module 72 further comprises a cylindrical lens 74 for collimating the emitting measuring light in (only) one direction and may further comprise other optical elements 75 like a diffuser or the like.

In addition to the shown embodiment, the module 72 may have a second diffuser to create a more homogenous intensity (reduce objective laser speckles). It may also employ any number of light sources (including just one source), a cylindrical Fresnel-lens instead of the refractive cylinder lens 74 and different mechanical mount geometry.

Figure 3:
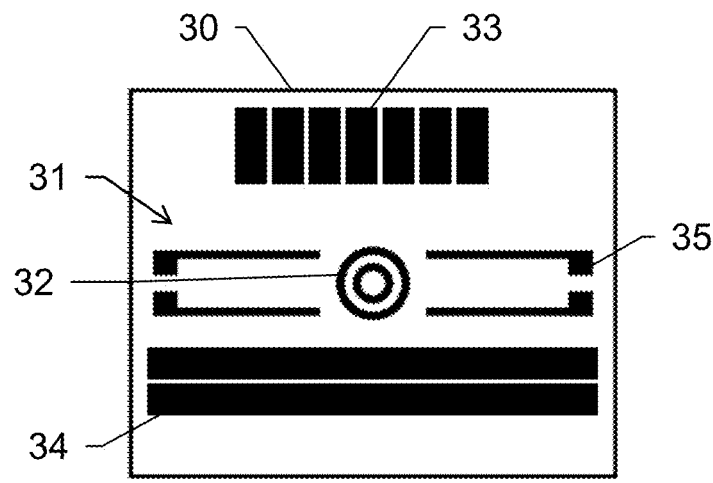
FIG. 3 shows an embodiment of a calibration target having a calibration pattern according to the invention.

Referring to the calibration target 30, the target 30 comprises a defined calibration feature or pattern 31 (FIG. 3).

The target 30 can be manufactured out of a slab of glass which can be lapped on the front and back side. The front side of the target 30 may be patterned with a thin (~1 μm) layer of chrome which constitutes bright and dark areas of a respectively provided calibration pattern 31. The roughness of the lapped glass surface can provide the diffuse reflection. Dark areas can be obtained in un-patterned areas where the raw lapped glass is exposed. This can result in a reflectivity of about 4% due to the air-glass step in index of refraction.

On the back side, the substrate of the target 30 may be painted with a black paint which has a similar index of refraction as the glass and thus absorbs light with very little reflection. To avoid interference from residual reflections on the back side, the substrate can be made thick enough that there is no overlap between the image of the laser line on the front side and the back side of the target. The back side of the target 30 may be polished.

A target 30 resulting from the above described target patterning method can be beneficial compared to a typical photogrammetric target which utilizes a volume-scattering porous surface in that it can have a very high flatness, no volume scattering and a very small depth difference between bright and dark regions.

The calibration target 30 of FIG. 3 has a flat surface onto which the target pattern 31 is applied. This pattern 31 has a central feature 32 (double ring) which defines a point in space, and may also have additional features 33 and 34 for fine-characterization of a profile of the projected measuring light, e.g. of a laser line, as well as features 35 to aid manual alignment of the calibration target 30 relative to the sensor 10.

The central feature 32 allows measurement of the position of the feature 32 in an image of the light receiving unit of the sensor 10 (e.g. scanner camera). For that, an image which covers the pattern 31 or in particular the feature 32 is captured and processed (image processing) and the feature 32 is recognised based on the processing. For example, a centre point of the imaged feature 32 can be calculated by that. The centre point can represent the position of the feature in the image.

Figure 4:
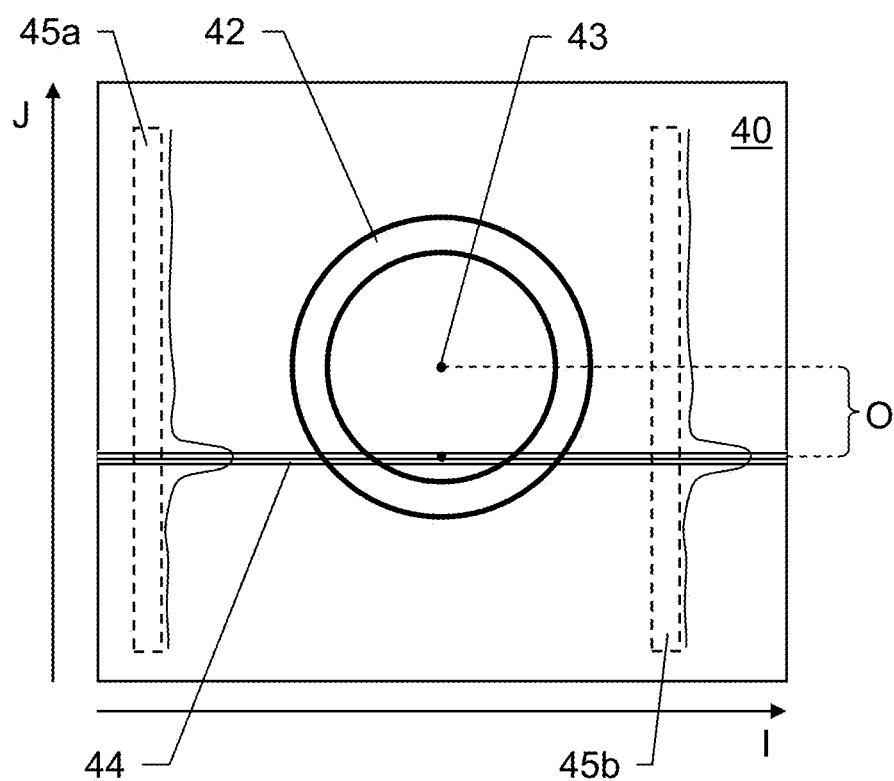
FIG. 4 shows an embodiment for a captured image which covers a calibration feature according to the invention.

FIG. 4 shows a captured image which covers a central calibration feature 42 similar to the one of FIG. 3. A centre point 43 (reference point) which is related to the position of the feature 42 in the image is determined by performing particular image processing (reference point image position).

Simultaneously, measuring laser light according to a defined pattern, here a laser line, is projected over the central feature of the calibration target. The laser line 44 and its position in the captured image 40 can be recognised by use of image processing as well. Such identification of the laser line 44 can be performed e.g. analysing pixel intensities or saturation along an image axis J. As shown, such analysing can be performed in at least two different image regions 45a and 45b in the image. By that and in particular by assuming that a projection of the laser line is basically linear the vertical position (regarding the axis J) of the laser line can be determined at least for two different horizontal (I) positions and a location of the line in the image can be derived.

On basis of such image processing an offset (O) between the captured feature 42, in particular the reference point, and the laser line can be determined in the image. Furthermore, by using the rings of the feature 42 as reference, e.g. knowing the dimensions of the feature, the local scale of the image can be determined as well.

The CMM 20 further provides an exact position of the calibration target 30 in the measuring volume and thus a defined position of the centre point of the central feature relative to the sensor 10 in the machine coordinate system. This means that a distance between the calibration target 30 and the triangulation sensor 10 (preferably with reference to the Y-axis) is defined and known.

For calibrating the triangulation sensor 10 the calibration target 30 now can be moved perpendicular to the Y-axis along the Z-axis stepwise or continuously, in particular as long as an image is acquired within which the reference point 43 coincides with or is close to the projected laser line 44. Based on the translation of the target 30 along the Z-axis a position (in machine coordinates) can be derived according to which the laser plane (laser line) corresponds with the reference point. Calibration data is derived based thereon. A transformation between outer machine X, Y, Z coordinates and inner sensor I, J coordinates can be derived based thereon.

The calibration data provides a position for the light reception unit (referring to the internal coordinate system of the triangulation sensor) according to which the laser line is detected in case a given distance (by the CMM) is measured with the sensor 10.

In other words referring to an alternative approach, a point on the laser plane (laser line) can be derived by taking the 3D position of the feature (given by the motion system) to which the laser line offset is added. This is then associated with the 2D image location of the laser line at the same position. These pairs of 2D-to-3D points then are the raw data for a calibration model.

The above described method can be performed at different Y-positions of the calibration target 30. For each position respective calibration data can be generated. The data can be combined and a set of global calibration data can be derived. By use of the global calibration data a virtual plane can be calculated with reference to the internal coordinate system and thus sensor-CMM-alignment may be provided for the triangulation sensor 10. By detecting the laser line with each of the images the laser plane can be calculated as well.

Now referring to an embodiment of the design of the calibration target (FIG. 3) and its pattern, the features 33 and 34 have very thin bright segments (e.g. much narrower than the resolution of the camera). By scanning them over the laser line (by movement of the CMM) it is possible to characterize the intensity profile with a high resolution equaling the width of these bright segments.

Of course an alternative feature can be used instead of the central feature 32, like a cross, a circle or an arrangement of points. A type of feature found very beneficial for this application is a ring (or double ring as in FIG. 3) since it has good immunity to gradient illumination, gradient blur, non-linear image sensor or -print, and further provides an accurate scale reference in its diameter. Many of these benefits arise from the fact that the inner and outer edge of the ring are affected in opposite direction with near identical magnitude. Simulations have shown that the position of the ring can be determined with an accuracy of 0.02 pixels under realistic levels of gradient intensity, gradient blur, intensity non-linearity and asymmetrical laser cut region.

The central feature is preferably designed so that the laser line height can be measured simultaneously with the image position of the point feature. This feature can be e.g. printed directly to the tracking target with any printing technique (lithography, screen printing, inkjet etc), or first printed to a thin substrate (e.g. sticker) then glued to the surface of the target 30. The size of the feature is preferably such that it can be imaged with reasonable sharpness, which means it is within the depth of field of a camera lens of the light receiving unit.

Figure 5A:
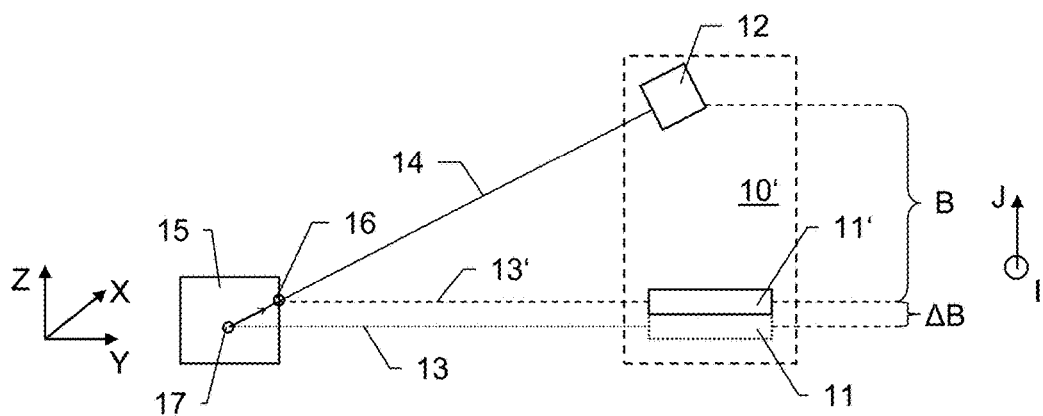
FIGS. 5a-b show possible deviations or errors regarding an emission of measuring light due to thermal influences.
Figure 5B:
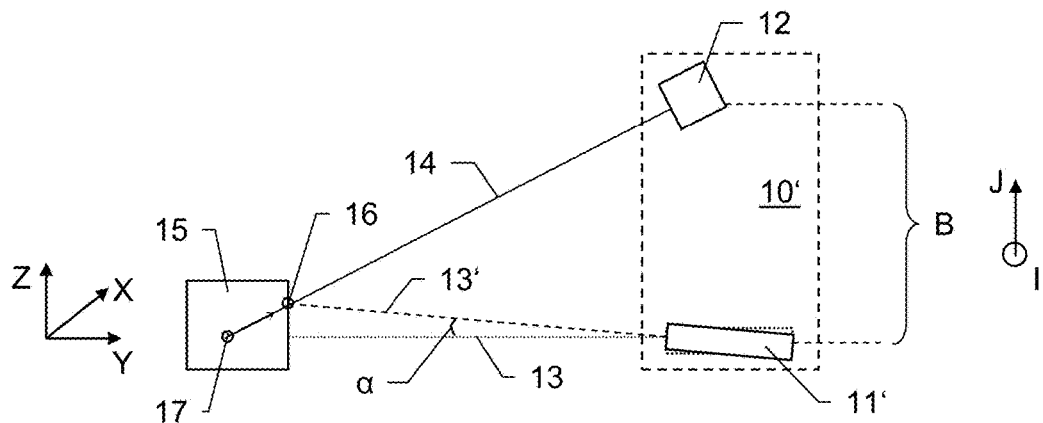

FIGS. 5a and 5b depict principles of possibly occurring errors by use of a triangulation sensor 10'. Typically, the distortion of scanner 10' hardware (e.g. due to temperature) is dominated by two effects: A change of the baseline B (FIG. 5a), and a change in pitch a of the laser (around the I-axis, FIG. 5b). Thanks to symmetry, remaining degrees of freedom can often be neglected as their influence is much smaller.

FIG. 5a shows a change of the baseline B of a triangulation sensor 10'. The sensor 10' comprises a light emitting unit 11, here a laser, and a camera 12 for detecting reflected light at an object 15 to be measured. A laser line 13 is emittable by the laser source 11. The laser in its original position is shown with reference sign 11.

However, in particular due to thermal changes, i.e. varying temperatures, a structural offset $\Delta B$ of the light source 11 may occur so that the laser is displaced into the position shown with reference sign 11'. If measuring light 13' is emitted with such offset $\Delta B$ the laser line is projected on the object 15 with a respective offset $\Delta B$ with reference to the J-axis. This means that the camera 12 sees the projected measuring laser line according to a reception direction 14, i.e. at a different J-position 16 on the object 15.

If the triangulation setup is supposed to be constant, i.e. without applying respective compensations, there would still be assumed that the laser line is emitted without any offset. As a result a virtual intersection point 17 of the original projection plane 13 and the reception direction 14 is supposed to be the relevant measuring position. As can be seen in FIG. 5a there exists a deviation of the true measuring position 16 relative to the virtual—but supposed to be the correct—point 17 in J- and I-axis (inner image coordinate system) or in XYZ-axes (outer coordinate system) respectively. A respective compensation of such error improves reliability and precision of triangulation measurements.

FIG. 5b shows a constant baseline B but a rotation of the emission axis around the I-axis due to e.g. thermal influences. As can be seen a deviation in the orientation of the emitted laser line from an original direction 13 to a deviated direction 13' can occur. In other words, the emission direction is shifted by an angle $\alpha$. As a result, the laser generates an illuminated pattern at a true position 16. Without further compensation, the system would assume that the illuminated region can only be provided by an intersection of the originally emitted laser 13 and a direction 14 according to which the projection is captured. An assumed measuring point 17 would be derived based on that. However, the correct measuring point would be the illuminated one 16. Again, there occurs an error in determination of coordinates of the measuring point if no compensation is applied.

To extend the range of temperatures where a measurement remains accurate, a calibration over temperature can be performed according to the invention.

Typically, the thermal calibration is done with a fixed target since it may be difficult to provide a reference motion which is accurate over temperature, and since it is difficult and expensive to regulate the temperature over the much larger volume required for the motion system.

Without a motion system it is however difficult to track the complete thermal distortion of the scanner (triangulation sensor). Typically, the artefact in thermal calibration is therefore a flat plate and only measurement errors in depth are compensated. Such methods also often require a re-"qualification" after each temperature change in which the 6-DOF "pose" of the scanner relative to the CMM is measured by scanning e.g. a sphere from multiple directions.

The invention presents an improved type of calibration target for thermal calibration which allows full tracking of the pose of the line laser as well as the camera pose, both relative to the mechanical reference frame. Thus, the scanner can remain accurate over a larger temperature range without re-qualification.

To characterize the behaviour of the sensor over temperature, a temperature-stable setup can be chosen. Thus, the sensor can be statically mounted to a jig (including targets and mounting angle) made out of materials with low coefficient of thermal expansion (CTE). The material could be e.g. invar, zerodur, macor or any other material with a sufficiently low CTE so that all variations in the measured signals can be attributed to thermal drift in the triangulation sensor itself.

Alternatively, a setup with a known coefficient of thermal expansion could be used so that the variation in the measured signal stemming from jig expansion can be subtracted to isolate the effect of the sensor itself.

The point of the laser plane, i.e. one point which represents a position (and orientation if several points are considered) of the laser plane, on a target can either be obtained by determining a laser line position offset relative to a 2D point feature (as shown with FIGS. 3 and 4) on one or more tracking targets and add this offset to the known 3D position (with reference to an outer coordinate system) of the point feature (as already described above).

Figure 6A:
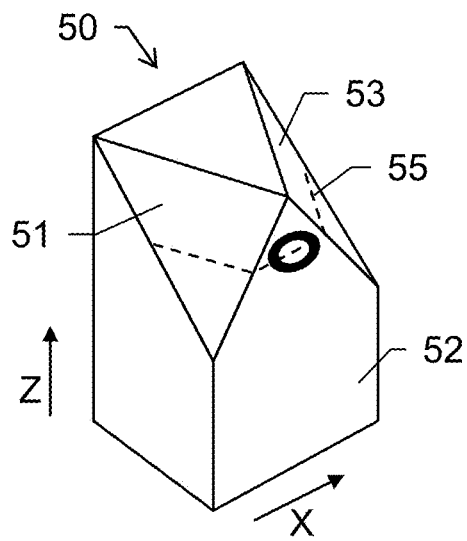
FIGS. 6a-b show an embodiment of a calibration target with defined 3D shape according to the invention and an image which covers part of the target.

Alternatively or additionally, by using a calibration target 50 with a 3D shape as depicted in FIG. 6a where a laser line 55 hits three surfaces 51-53 with different inclinations, the height of the laser plane, i.e. a position of the projection of the laser plane onto the calibration target 50 along a Z-axis (or along a J-axis in the inner sensor image coordinate system), can also be deduced directly from the length of a middle line segment, i.e. a length of the projection of the laser line on the surface 52.

The measuring light and the calibration feature—pattern or shape of the target—are both detected and recorded by the light receiving unit of the triangulation sensor.

Figure 6B:
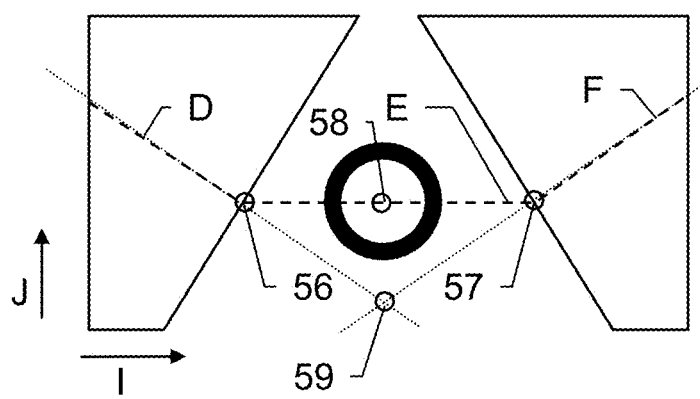

Deriving the Z-coordinate of the projected laser line 55 using the shaped target 50 is illustrated in FIG. 6b which shows how the line on the surfaces would be imaged as three line segments D, E, F in an image of the light receiving unit (camera) of the triangulation sensor (scanner). By tracing each line segment and fitting respective straight lines it is possible to accurately determine the intersection points 56,57 between line segment D and E, E and F respectively. Based on a basic calibration of the scanner, these image intersection points can then be converted to real world coordinates (outer coordinate system) and the width of the E segment calculated. Knowing the shape of the 3D target 50, the width can then be converted to a position in height, i.e. a coordinate with reference to the Z-axis. Furthermore, the intersection of segments D and F can be calculated, and from this the laser pitch angle (i.e. around the I-axis) of the laser plane.

If the first method is used (measure a vertical offset of laser line relative to photogrammetrical feature), the calibration target does not need to have the multi-faceted shape but can also be flat, cylindrical or have any other shape which allows a photogrammetric point feature to be attached onto the surface and imaged by the camera (e.g. like in FIG. 3). The point can also be defined by a combination of photogrammetric texture and object shape, e.g. a "roof" shape with a straight line which when viewed at an angle defines a point at the peak of the "v"-shaped image of the broken line.

To increase precision, the height of the laser line can be measured over a longer length than only inside of a printed ring (or other type of feature). To obtain one single value, a line is then fitted to all obtained points on the laser line 55 and lastly the height of the fitted line at the horizontal position of the point feature is calculated.

Since the spatial resolution of the measurement does not have to be as high for thermal compensation as in geometrical calibration, larger features would also be viable.

To reduce the effect of spatial pixel quantization when the laser line 55 is very thin (i.e. thinner than two camera pixels) it is beneficial to tilt the surface of the target 50 sideways so that the imaged line is not perfectly horizontal in the camera image.

Figure 2B:
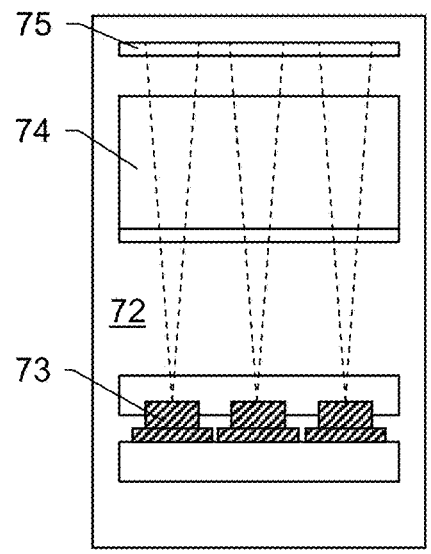

To be able to image the point feature, a second illumination source which lights up all targets can be provided. To avoid shifts due to chromatic distortion, this further illumination source could have the same wavelength as the laser of the scanner. The illumination therefore preferably uses LEDs or lasers to get a correct wavelength and narrow spectrum, but could also be a filament or arc lamp with a suitable band-pass filter. There can either be one or more wide-angle lamps which illuminate all targets at once, or several smaller lamps which light up each target individually. These illuminations could e.g. be constructed like the one show with FIGS. 2a and 2b with double diffusers, 90 degree rotated relative to each other to spread light both vertically and horizontally.

Since there is no motion involved it is possible to divide each measurement point into two exposures: One with only the measuring light (laser) enabled, and one with only the wide-angle illumination. This way, all parts of the feature can be used in the calibration without having to remove points too close to the laser line. If there is large difference in illumination over the scene, even more images can be taken with different exposure times so that the one or more targets are optimally exposed.

In the shown embodiment of the target 50 this is designed to allow separation of baseline shift from laser pitch variation. As shown in FIG. 6a, the target has a flat middle surface 52 and two sloped side surfaces 51,53. The calibration setup is provided so that the triangulation sensor is mounted relative to the target 50 so that the laser line 55 hits the middle surface 52 e.g. perpendicularly. Thus, the length of the laser line 55 (along X-axis) on the central part 52 depends on the height of the laser line (position along Z-axis).

In one embodiment the middle surface 52 is slightly tilted relative to an optical axis of the light emitting unit of the sensor.

By calculating the intersection points 56 and 57 in the captured image, the length of E can be determined (FIG. 6b) in camera coordinates, i.e. in the I-axis, and by transformation in outer (real world) coordinates, i.e. in the X-axis. With a known shape of the target 50 and the dimensions of the surfaces 51-53 and by knowing the correlation between the length of the line on the surface 52 and its thereon dependent position in Z-direction, this length can be converted to a Z-coordinate (J-coordinate respectively) and one point 58 on the laser plane can be calculated. Additionally, the intersection of segments D and F is calculated, and from the distance between this intersection point 59 and the line E the laser pitch angle can be calculated. This is because the slope of the light projected on the surfaces 51 and 52 varies due to a pitch of the laser line, in particular around the X-axis.

As the shape and dimension of the calibration target 50 are known and the sensor and the target 50 are arranged in a well-defined manner, a transformation of coordinates between the inner coordinate system (I, J) and the outer coordinate system (X, Y, Z) is provided. Using image processing on a feature (like the shown ring) a transformation scale can be calculated as well. The scale can be derived between the pixel coordinate system (inner coordinate system; I, J) and the outer system (X, Y, Z) so that a real-world distance between the ring and laser line can be derived based on image measurement.

Assuming the camera is still, a roll of the laser (rotation around the Y-axis) can also be measured by measuring the angle of segment E relative to a horizontal direction and/or a height difference of the points 56 and 57. Thus, all relevant degrees of freedom of the laser plane can be tracked.

With a single target it is hardly possible to track the motion of the camera independently of a possible motion of the laser plane. This means that the camera location and angle must be assumed to be fixed relative to the target 50 over temperature.

As one remark, with just one flat target having a photogrammetrical feature it is not possible to distinguish between an offset or a pitch of the laser line since the main effect seen on a flat or shallow target is a shift of the line in the Z-direction.

However, with a calibration target as shown in FIG. 6a it is possible to track the laser pitch independently of the baseline change AB (offset). The two variables measured are then the length of the middle segment E and the intersection point 59 of segments D and F relative to the height of the middle segment E. By geometrical calculations, these values can be converted into baseline offset and laser pitch angle α.

Figure 7:
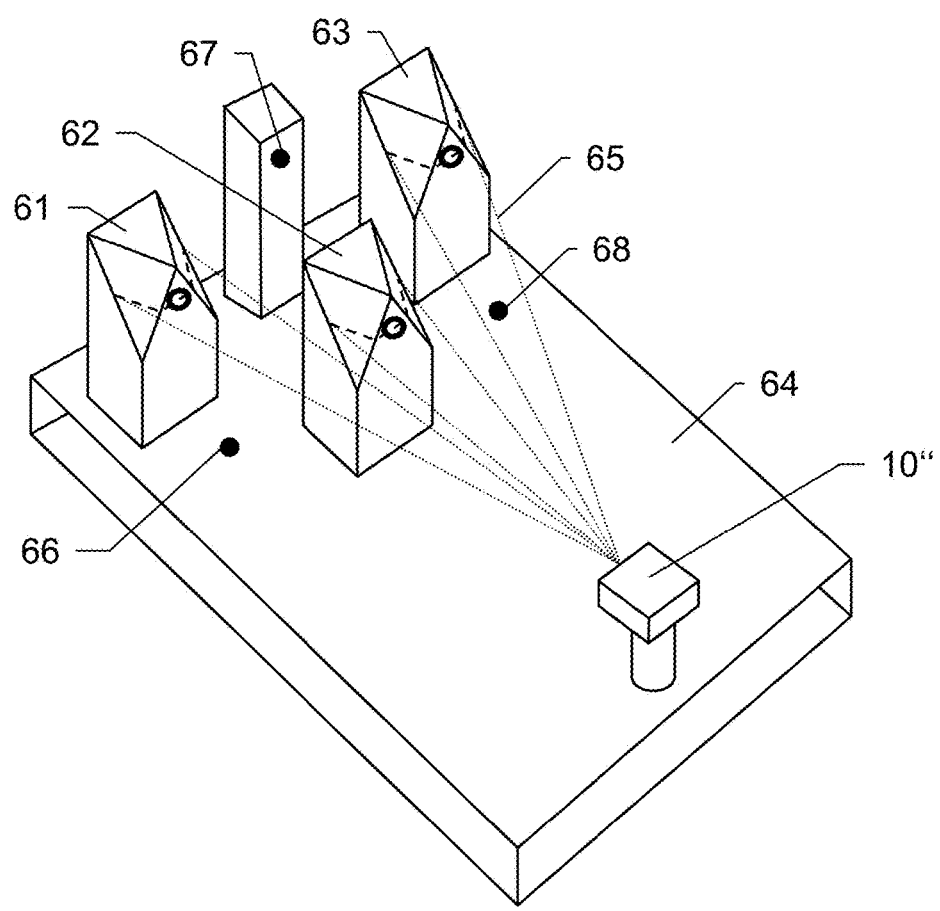
FIG. 7 shows an embodiment of a calibration setup with three calibration targets.

FIG. 7 shows an arrangement according to the invention having three calibration targets 61-63 and one triangulation sensor 10". The targets 61-63 and the sensor 10" are arranged on a jig base 64 with low CTE.

By that, the laser pitch and roll angles can be more accurately determined from the set of three points e.g. instead of using intersection point 59 as described above.

To track the camera motion (of the sensor 10") over temperature, three points on the projected laser plane 65 are compared to the image locations thereof. Either by converting the image coordinates of e.g. respective intersection points 56 or 57 (for each target) to 3D points using the information about the 3D shape of the targets 61-63, or by calculating the image positions of the 3D points by processing a position of an allied pattern.

In FIGS. 5a and 5b, the comparison is illustrated by the "apparent point" 17 and "actual point" 16 marks. The actual point is the one calculated by using the segment B width (as described above for the single target setup), and the apparent one is the point obtained by converting the image space coordinate of point 58 to a 3D point by calibration application.

Knowing the apparent and true points for three points (one on each target) it is possible to calculate all six degrees of freedom of the camera motion e.g. by numerical optimization methods.

The goal of the here described method is to track the movement of the camera and laser independently, relative to the mechanical (outer) reference frame defined by the mounting point of scanner 10" to the jig 64 and relative to each other. This is done over the range of temperature within which the scanner 10" is to be used. For that, the arrangement of sensor 10" and targets 61-63 is provided within a controllable climate volume. The so calibrated pose of the camera and laser as function of temperature can then be used to adjust a first (geometrical) calibration model or to apply a second compensation term so that the triangulation sensor 10" can measure accurately over a large range of temperatures.

For the camera module, drift in all six degrees of freedom (DOF) has an impact on the scanning accuracy. All six DOFs can be tracked by imaging at least three photogrammetrical point features (shown as black rings) on the tracking targets 61-63.

For the laser module, some degrees of freedom are not necessary to track since they do not affect the laser plane position or orientation. Namely, translations in the laser plane (X- and Y-axis) and rotation around the laser plane normal (Z-axis) can be neglected. The remaining three degrees of freedom (out of plane translation and rotations) can be tracked and can be so by measuring at least three points in the laser plane, one on each of the tracking targets 61-63.

To improve the accuracy of the camera pose estimation it would be beneficial to have at least one point feature 66-68 in another plane than the three regular targets 61-63. However, since the depth of field of the camera is typically a few millimeters deep it can be difficult to image out-of-plane targets 66-68 sharply. Those targets should thus be adapted to the lack of sharpness, and could e.g. be a filled circle as shown. This circle may show up as an un-sharp "blob" in the image, but can still be tracked precisely by its centre of gravity.

Of course, it is to be understood that the targets may provide alternative shapes and dimensions which allow determination of laser line offset and pitch. The targets may for example provide flat sideways-tilted surfaces.

Although the invention is illustrated above, partly with reference to some specific embodiments, it must be understood that numerous modifications and combinations of different features of the embodiments can be made and that the different features can be combined with each other or with triangulation or calibration approaches known from prior art.

What is claimed is:

1. A method for calibrating a triangulation sensor including a light emitting unit for emitting measuring light of defined chromatic measuring properties and a light receiving unit for reception of light according to defined chromatic reception properties, wherein the chromatic reception properties are adjusted to the chromatic measuring properties, the light emitting unit being arranged with known position and orientation relative to the light receiving unit, the method comprising:
   providing triangulation-based position measurements using the triangulation sensor by determining image positions of reflected measuring light in an inner sensor image coordinate system (I, J);
   defining a calibration pattern using a calibration setup including the triangulation sensor and a calibration target;
   performing a calibration measurement with reference to the calibration target by means of the triangulation sensor; and
   providing the triangulation sensor and the calibration target in defined relative position with reference to an outer coordinate system (X, Y, Z),
   wherein the calibration measurement is performed by:
      directing the measuring light towards the calibration target so that the measuring light impinges on the calibration target,
      capturing an image of the calibration target by means of the light receiving unit,
      processing the captured image by:
         deriving a pattern image position with reference to an inner sensor image coordinate system, the pattern image position provides information about a position of the calibration pattern in the captured image, and
         deriving a light image position with reference to the inner sensor image coordinate system (I, J), the light image position provides information about a position of the measuring light impinging on the calibration target in the captured image, and
      deriving calibration data based on:
         the relative position of the triangulation sensor and the calibration target,
         the pattern image position, and
         the light image position.

2. The method according to claim 1, wherein the calibration pattern defines a reference point at the calibration target and a reference point image position which represents the position of the reference point in the captured image is determined based on the processing of the captured image.

3. The method according to claim 2, further comprising:
   determining a distance or an orientation of the impinging measuring light relative to the reference point image position in the captured image by means of the processing of the captured image, and
   deriving an offset (O) of a projection of the measuring light relative to the reference point and processing the calibration data based on the offset (O).

4. The method according to claim 1, wherein:
   a defined distance between the triangulation sensor and the reference point is provided with reference to the outer coordinate system (X, Y, Z) and
   calibrating the triangulation sensor is performed based on respective distance data referring to the outer coordinate system (X, Y, Z),
      the reference point image position referring to the inner sensor image coordinate system (I, J) defined by the triangulation sensor and
      the light image position referring to the inner sensor image coordinate system (I, J),
   wherein a transformation of coordinate data is provided based on two sets of coordinate data for the reference point, wherein a first set refers to the outer coordinate system (X, Y, Z) and a second set refers to the inner sensor image coordinate system (I, J).

5. The method according to claim 1, further comprising:
   illuminating the calibration target with illumination light of defined chromatic illumination properties, wherein the chromatic illumination properties are adjusted to the chromatic reception properties so that measuring light and illumination light is detectable by the light receiving unit.

6. The method according to claim 1, wherein the calibration setup comprises a positioning device which is arranged to provide defined and variable relative positioning of the calibration target and the triangulation sensor.

7. The method according to claim 6, further comprising:
capturing a series of images of the calibration target according to the set of different relative positions by means of the light receiving unit;
processing the series of images to derive a series of pattern image positions which provides information about positions of the calibration pattern in the series of images; and
deriving the calibration data based on:
the set of different relative positions, and
the series of pattern image positions.

8. The method according to claim 6, wherein the positioning device is embodied as a coordinate measuring machine, and wherein:
at least one of the calibration target or the triangulation sensor is arranged at the probe head for being varied in its position by means of the coordinate measuring machine.

9. A controlling and processing unit for calibration of a triangulation sensor using a calibration target including a calibration pattern, the controlling and processing unit comprising:
a calibration means which generates calibration data by:
receiving positional information regarding a defined relative position of the triangulation sensor and the calibration target with reference to an outer coordinate system (X, Y, Z),
receiving a pattern image position with reference to an inner sensor image coordinate system (I, J), the pattern image position provides information about a position of the calibration pattern in an image captured by a light receiving unit of the triangulation sensor,
receiving a light image position with reference to the inner sensor image coordinate system (I, J), the light image position provides information about a position of measuring light impinging on the calibration target in the captured image, and
deriving the calibration data based on:
the relative position of the triangulation sensor and the calibration target,
the pattern image position, and
the light image position.

10. A method for calibrating a triangulation sensor including a light emitting unit for emitting measuring light of defined chromatic measuring properties with a defined light pattern and a light receiving unit for reception of light according to defined chromatic reception properties, wherein the chromatic reception properties are adjusted to the chromatic measuring properties, the method comprising:
providing triangulation-based position measurements using the triangulation sensor by determining image positions of reflected measuring light in an inner sensor image coordinate system (I, J);

defining a calibration pattern using a calibration setup including the triangulation sensor and a calibration target;
performing a calibration measurement with reference to the calibration target by means of the triangulation sensor; and
providing the triangulation sensor and the calibration target in defined relative position with reference to an outer coordinate system (X, Y, Z),
wherein the calibration measurement is performed by:
providing the triangulation sensor and the calibration target inside of a climate volume in defined relative position with reference to an outer coordinate system (X, Y, Z),
performing the calibration measurement by
directing the measuring light towards the calibration target so that the measuring light impinges on the calibration target,
applying a defined variation of a temperature in the climate volume and thereby defining a set of calibration temperatures,
capturing a set of images of the calibration target by means of the light receiving unit at least according to the set of calibration temperatures and
processing the set of captured images with deriving a respective set of light pattern appearances with reference to an inner sensor image coordinate system (I, J), the light pattern appearances provide information about course and/or position of the light pattern projected on the calibration target in the captured image, and
deriving calibration data based on:
the relative position of the triangulation sensor and the calibration target,
the set of calibration temperatures, and
the set of light pattern appearances.

11. The method according to claim 10, wherein:
the calibration feature is provided by a structural design of the calibration target, wherein the calibration target defines at least one edge,
the measuring light is directed towards the calibration target so that the light pattern covers the edge, and
the deriving of the set of light pattern appearances comprises determining the courses of the projected light patterns covering the edge.

12. The method according to claim 11, wherein:
the calibration target is aligned and designed so that the calibration feature provides a planar surface facing the triangulation sensor,
the planar surface provides a varying width in a first direction (X) with respect to a second direction (Z), and
the determinations of the set of light pattern appearances comprise
determining the extensions of the light pattern (E) on the planar surface in the first direction (X) based on the width,
deriving a position of the light pattern in the second direction (Z) based on the determined width.

* * * * *